United States Patent [19]
Cole et al.

[11] 3,774,643
[45] Nov. 27, 1973

[54] PROPORTIONING VALVE

[75] Inventors: George S. Cole, Chicago; Richard L. Ritzenthaler, Alden, both of Ill.

[73] Assignee: George S. Cole, Chicago, Ill.; Cavour Hartley; H. B. Fryberger, Jr.; Alfred Hartley; Donald G. Ellison, as receiver for John O. Baker; Guilford Hartley, and Donald G. Ellison, all of Duluth, Minn.

[22] Filed: Mar. 9, 1972

[21] Appl. No.: 233,147

[52] U.S. Cl.................. 137/636.4, 137/607, 251/4
[51] Int. Cl............................................. F16k 19/00
[58] Field of Search............. 137/607, 636.4, 625.4; 251/4–10; 417/474–477

[56] References Cited
UNITED STATES PATENTS

| | | | |
|---|---|---|---|
| 3,172,426 | 3/1965 | Cole..................................... | 251/7 X |
| 3,519,018 | 7/1970 | Cole et al. ......................... | 137/625.4 |
| 3,187,774 | 6/1965 | Leigh et al........................... | 251/7 X |

Primary Examiner—Robert G. Nilson
Attorney—Curtis F. Prangley et al.

[57] ABSTRACT

A proportioning valve of the single control type for two streams of fluid, such as hot and cold water, having a valve body including a removable cap, an elongated tapered control cam mounted in the valve body for longitudinal and rotational movement and a pair of generally U-shaped resilient tubes, one for each fluid stream, in the valve body, the cam engaging central portions of the tubes in pinching manner to close, open, vary the rate of and proportion the fluid flow through the tubes. The valve body has a pair of fluid inlet conduits close to and generally parallel with the control cam, thereby minimizing the transverse cross-sectional area of the body and enabling the body and cam to have generally in-line relation, providing a valve with compact characteristics suitable for lavatory, kitchen, tub and shower.

8 Claims, 5 Drawing Figures

PATENTED NOV 27 1973 3,774,643
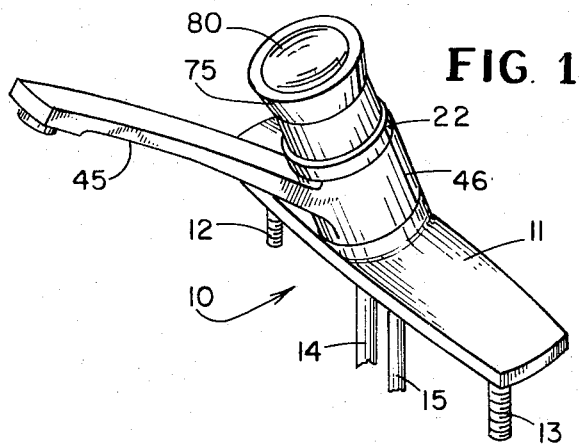
FIG. 1
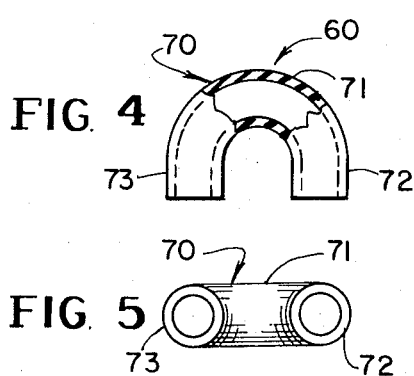
FIG. 4
FIG. 5
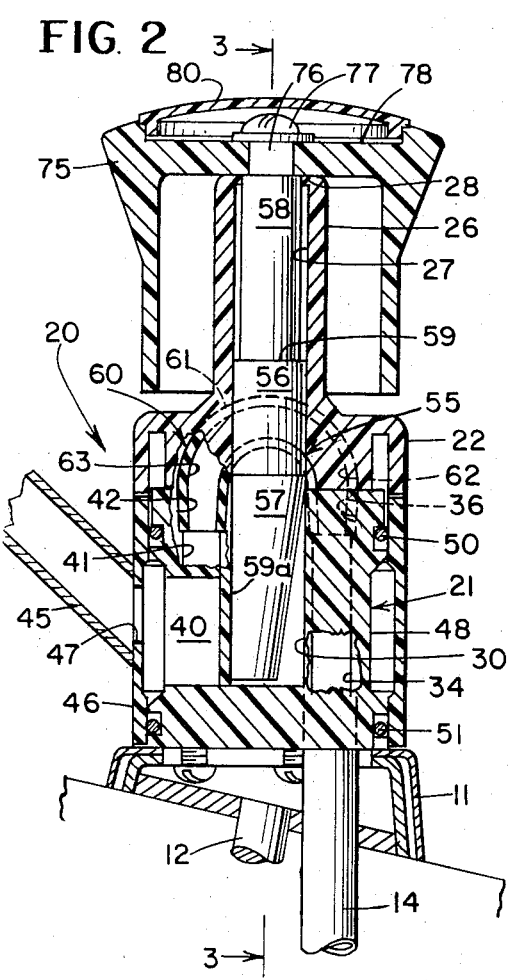
FIG. 2
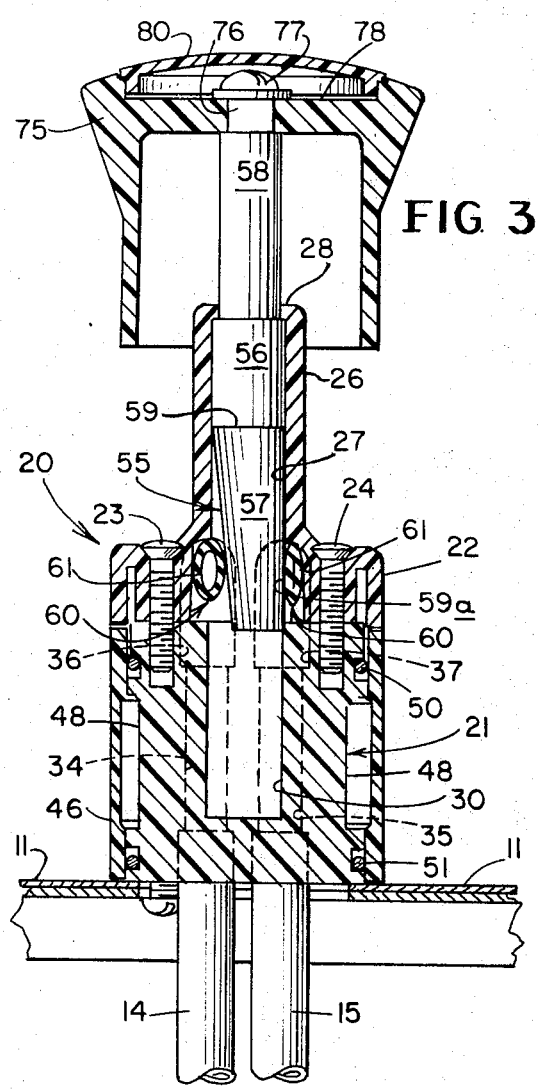
FIG. 3

PROPORTIONING VALVE

BACKGROUND OF THE INVENTION

This invention relates to a proportioning valve, and more particularly to a proportioning valve for two streams of fluid, such as hot and cold water, the valve being operable by a single control for proportioning the flow of the respective fluids and varying the rate of fluid flow.

The invention utilizes a pair of resilient tubes mounted in side by side relation within a compact valve body and an elongated tapered control cam extending between the two tubes, the cam being mounted with in-line relation in the body for longitudinal and rotational movement and adapted to pinch the tubes to thereby close, open and proportion the fluid flow through the tubes.

A proportioning valve embodying the present invention meets the geometrical requirements of compact size and shape for use in faucets designed for lavatory, kitchen, tub and shower.

The closest prior art known to applicants is U.S. Pat. No. 3,172,426 and corresponding Canadian Pat. No. 740,235, both issued to one of the present applicants.

The proportioning valve of the aforesaid patents, while providing functional and cost improvements over predecessor proportioning valves, possesses size and shape characteristics not entirely acceptable to the plumbing industry or the ultimate users. The present invention, as will be seen, provides a proportioning valve which not only possesses the functional and low cost attributes of the valve of the aforesaid patents, but also possesses size and shape characteristics rendering the valve wholly compatible with established present day standards of size and shape.

SUMMARY OF THE INVENTION

The invention contemplates a proportioning valve having a compact valve body, usually circular in transverse cross section, an elongated tapered control cam mounted in the valve body in in-line relation for longitudinal and rotational movement, and flow control conduit means in the body having a pair of resilient tube portions disposed in side by side relation on opposite sides of the cam for shut-off and proportioning pinching engagement by the cam. The control cam is completely isolated from the fluid with which the valve is used.

The valve body has a longitudinal opening for the control cam, a pair of fluid inlet conduits and a fluid outlet conduit means, the conduits and conduit means being clustered around the longitudinal opening with at least the inlet conduits being generally parallel therewith, thereby minimizing the transverse cross-sectional area of the body. The flow control conduit means connects at one end with the fluid inlet conduits and at the other end with the fluid outlet conduit means.

In more detailed aspect, the valve body of the illustrated embodiment includes a removable cap providing access to the flow control conduit means, the resilient tube portions of the flow control conduit means for the most part being mounted in the cap. The control cam is journalled in the cap for longitudinal and rotational movement.

The flow control conduit means of the valve is connectible with the fluid inlet conduits and with the fluid outlet conduit means by movement in the general direction of the assembly of the cap of the valve body, and is accessible on removal of the cap.

In preferred form, the flow control conduit means comprises a pair of U-shaped resilient tubes in spaced side by side relation, the central portions of the tubes being engaged by the control cam and the end portions of the tubes being respectively connected to the fluid inlet conduits and the fluid outlet conduit means. The end portions of the tubes which connect with the fluid inlet conduits extend generally at right angles to the central portions engaged by the control cam.

BRIEF DESCRIPTION OF THE DRAWING

FIG. 1 is a perspective view of a kitchen or lavatory faucet utilizing a proportioning valve embodying the present invention.

FIG. 2 is an enlarged longitudinal sectional view, partly broken away, of the proportioning valve used in the faucet of FIG. 1, the valve shown in closed position.

FIG. 3 is a longitudinal sectional view on line 3—3 of FIG. 2, the valve shown fully open with the proportioning setting such that one fluid stream is open and the other closed.

FIG. 4 is a side elevational view, partly broken away, of a U-shaped resilient tube used in the illustrated embodiment of the invention.

FIG. 5 is a bottom plan view of the tube shown in FIG. 4.

DESCRIPTION OF THE PREFERRED EMBODIMENT

Referring to the drawing, FIG. 1 shows an exemplary faucet 10 suitable for kitchen or lavatory utilizing a proportioning valve embodying the invention. Faucet 10 has a conventional base 11 adapted to mount on a sink or basin (not shown), the base 11 having threaded studs 12 and 13 for mounting purposes. Tubes 14 and 15 lead from faucet 10 to connect with supply lines, for example, hot and cold water lines. The remaining parts of faucet 10 will be described in connection with FIGS. 2 and 3 of the drawing.

Referring to FIGS. 2 and 3, proportioning valve 20, adapted for use in a faucet such as faucet 10 in FIG. 1, includes a valve body generally designated 21 which, in the illustrated embodiment, has a removable cap 22 as a component part. Suitable means such as screws 23 and 24 (FIG. 3) secure cap 22 to the remaining part of the valve body 21.

Cap 22 has an upper tubular portion 26, the inner cylindrical surface 27 of which provides bearing for a control cam to be described later. The upper end of tubular portion 26 terminates in an inwardly extending flange 28 which serves as a stop to limit the outward longitudinal movement of the control cam, as will be seen.

The non-cap part of valve body 21 has a longitudinal circular opening 30 which, as illustrated, terminates short of the lower end of the body. Opening 30 is in alignment with inner cylindrical surface 27 of tubular portion 26 of cap 22, as shown in FIGS. 2 and 3.

As best shown in FIG. 3, valve body 21 has a pair of fluid inlet conduits 34 (also shown in FIG. 2) and 35, the supply tubes 14 and 15 being connected respectively to the conduits 34 and 35 in leakproof manner. The upper ends of inlet conduits 34 and 35 in the non-cap part of valve body 21 are enlarged and tapered outwardly from bottom to top as shown at 36 (also shown in FIG. 2) and 37. The purpose of the tapered enlargements will be mentioned later.

As best shown in FIG. 2, body 21 also has a fluid outlet conduit means, the outlet conduit means including a recess 40 of minor peripheral and longitudinal extent in the exterior surface of the body and a pair of like outlet conduits 41 leading upwardly from recess 40 to enlarged outwardly tapering upper ends 42.

The fluid inlet conduits 34 and 35 are generally parallel with longitudinal opening 30, and both the inlet conduits 34 and 35 and the outlet conduit means 40, 41 and 42 are clustered around and in close proximity with opening 30, thereby minimizing the transverse cross sectional area of body 21 and providing a compact valve body of desirable size and shape.

Valve 20 has a spout 45 (FIGS. 1 and 2), and it will be understood that the spout structure and relationship between spout and valve are subject to variation depending on the design requirements of the particular faucet. Illustrated spout 45 is part of a so-called swing spout assembly which includes a cylindrical collar 46 (FIGS. 2 and 3) surrounding the non-cap part of body 21 and adapted to rotate with respect to the body. An opening 47 (FIG. 2) in collar 46 leads to spout 45.

In the illustrated form of the invention employing the swing spout assembly, recess 40 of the fluid outlet conduit means extends at reduced radial depth completely around the valve body 21, as indicated by shallower recesses 48 at quadrature regions of the valve body in FIGS. 2 and 3. Thus, fluid from outlet conduits 41, 41 of valve body 21 fills annular recess 40, 48 and enters spout 45 through opening 47 regardless of the angular position of the swing spout assembly on the valve body.

Resilient sealing rings 50 and 51, such as O-rings, between valve body 21 and collar 46 respectively above and below annular recess 40, 48 are provided for conventional sealing and rotational purposes.

An elongated tapered control cam 55 is mounted in in-line relation in valve body 21, the control cam having a cylindrical portion 56 journalled in cylindrical surface 27 of tubular portion 26 of cap 22 and an eccentric tapered portion 57 extending into longitudinal opening 30.

Cam 55 has an upper stem 58 of reduced cross section, providing a shoulder 59 for engagement with stop flange 28 of tubular portion 26 of cap 22, limiting outward longitudinal movement of control cam 55.

Control cam 55 is shaped generally like the cam shown in FIG. 18 of aforesaid U.S. Pat. No. 3,172,426 and Canadian Pat. No. 740,235. Present portion 56, as mentioned, is cylindrical, and tapered portion 57 has a shape that may be described as an eccentric cone. Tapered portion 57 is substantially circular in transverse cross section throughout, the circular sections decreasing in diameter more or less uniformly from top to bottom, the several cross sections being aligned with each other and with cylindrical portion 56 along an elementary surface line 59a, as shown at the lefthand side of cam 55 in FIG. 2.

Flow control conduit means generally designated 60 in FIGS. 2 and 3 is contained within suitable openings in valve body 21. Flow control conduit means 60 includes a pair of resilient flexible tube portions 61, 61 (FIG. 3) disposed in side by side relation on opposite sides of control cam 55 for shut off and proportioning pinching engagement by the control cam as the cam is moved longitudinally and rotatably. Tube portions 61, 61 are formed of natural or synthetic resilient rubber, or other suitable resilient plastic material. Flow control conduit means 60 also has a pair of inlet portions 62, 62 (one of which is shown in FIG. 2) connected in sealed relation to the enlarged tapered upper ends 36 and 37 of the fluid inlet conduits 34 and 35. Further, the resilient tube portions 61, 61 have outlet portions 63, 63 (one of which is shown in FIG. 2) connected in sealed relation to the enlarged tapered upper ends 42 of outlet conduits 41 of the outlet conduit means 40, 41, 42 in valve body 21.

It will be noted that inlet portions 62, 62 of the flow control conduit means 60 extend generally at right angles to the resilient tube portions 61, 61 which are engaged by cam 55, cooperating to establish the compact characteristic of the proportioning valve. Similarly, the directionality of the connection between the flow control conduit means 60 and the fluid inlet conduits 34, 35 and the fluid outlet conduit means 40, 41, 42 is in the same general direction of the assembly of cap 22 with the remaining part of valve body 21.

Referring to FIGS. 4 and 5, flow control conduit means 60 in the illustrated form of the invention comprises a pair of U-shaped resilient tubes 70, one of which is shown. The central portion of the U-shaped tube 70 engaged by control cam 55 is designated 71, the inlet end portion 72 and the outlet end portion 73.

Referring again to FIGS. 2 and 3, flow control conduit means 60 comprising U-shaped tubes is mounted for the most part in openings of suitable size and shape in cap 22. Thus, when cap 22 is removed, the flow control conduit means 60 is rendered accessible for inspection, and replacement if necessary.

Completing the description of proportioning valve 20, a suitable handle 75 is non-rotatably secured to the upper end of control cam 55. To insure the desired non-rotatable relationship between handle 75 and cam 55, a non-circular upper end 76 of cam 55 is received within a similarly shaped opening in handle 75, and the handle secured to the cam by suitable means such as screw 77. A recess 78 for screw 77 is covered by closure 80. As shown in FIG. 2, inward longitudinal movement of cam 55 is limited by engagement of handle 75 with the upper end of tubular portion 26 of cap 22.

Operation of proportioning valve 20 is believed more or less self-explanatory from the foregoing description. Briefly, control cam 55 engages flow control conduit means 60 and alters the cross-sectional areas of flexible tube portions 61, 61 in accordance with longitudinal and rotational positions of the cam. When cam 55 is at the inward position shown in FIG. 2, cylindrical portion 56 of the cam engages flexible tube portions 61, 61 at all rotational positions of the cam and closes the tube portions to the passage of fluid. In such position of cam 55, a tube portion 61 has the closed shape as shown at the right in FIG. 3, the portion of cam 55 engaging the tube portion there shown being the portion containing elementary surface line 59a on tapered portion 57, which line also falls on the surface of cylindrical portion 56.

When control cam 55 is moved ouwardly either all the way, as shown in FIG. 3, or to an intermediate position, opposed surfaces of tapered portion 57 will be in engagement with flexible tube portions 61, 61, establishing cross-sectional areas of the tube portions in accordance with longitudinal and rotational settings of the cam. For example, if handle 75 were rotated 90° in either direction from the rotational position shown in FIG. 3, tube portions 61, 61 would be open, and of like cross-sectional area, permitting equal quantities of the two fluids to flow through the valve, be mixed in outlet conduit means 40, 48 and flow through opening 47 to spout 45. Intermediate rotational positions of cam 55 change the proportions of the two fluids, and longitudinal movement of control cam 55 varies the rate of fluid flow through the valve.

The proportioning valve of the invention has no internal discontinuities affecting the free flow of fluid, and therefore is not subject to clogging due to sediment in the fluid. The valve virtually is self-cleaning, and no screens, which themselves are subject to clogging, are needed to exclude particles. As previously mentioned, fluid does not come in contact with control cam 55, so the cam is subject to permanent lubrication. Further, the valve with resilient tube portions 61, 61 of a given size has comparatively high capacity flow with minor pressure drop, due to venturi effect. In addition, the valve is substantially noiseless in operation, and the operating characteristics are such that fluid hammer in the system does not occur. The valve is comparatively inexpensive to manufacture, and the parts thereof may be made of plastic material, providing further economy.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A proportioning valve for two streams of fluid, comprising:
   a valve body having a longitudinal opening, a pair of fluid inlet conduits and fluid outlet conduit means, said conduits and conduit means clustered around said longitudinal opening and generally parallel therewith, thereby minimizing the transverse cross-sectional area of said body;
   an elongated tapered cam mounted in said body for longitudinal and rotational movement in said opening; and
   flow control conduit means in said body consisting of a pair of U-shaped resilient tubes disposed on opposite sides of said cam for shut off and proportioning pinching engagement by said cam, each U-shaped resilient tube connected at one end to one of said fluid inlet conduits and at the other end to said fluid outlet conduit means,
   whereby said valve body and said cam have in-line relation, providing a valve with a compact characteristic suitable for lavatory, kitchen, tub and shower.

2. The proportioning valve of claim 1 wherein said valve body includes a removable cap providing access to said flow control conduit means.

3. A proportioning valve for two streams of fluid, comprising:
   a valve body including a removable cap;
   an elongated tapered cam mounted for longitudinal and rotational movement within said body and extending through said cap;
   a pair of fluid inlet conduits in said body;
   fluid outlet conduit means in said body having an outlet opening; and
   flow control conduit means in said body consisting of a pair of U-shaped resilient tubes disposed on opposite sides of said cam for shut off and proportioning pinching engagement by said cam, each U-shaped resilient tube connected at one end to one of said fluid inlet conduits and at the other end to said fluid outlet conduit means;
   said flow control conduit means being connectible with said fluid inlet conduits and with said fluid outlet conduit means in the general direction of the assembly of said cap, and being accessible on removal of said cap.

4. The proportioning valve of claim 3 wherein said U-shaped resilient tubes are mounted for the most part in said cap.

5. The proportioning valve of claim 3 wherein the portions of said U-shaped resilient tubes engaged by said cam are mounted in said cap.

6. The proportioning valve of claim 4 wherein said cam is journalled in said cap.

7. A proportioning valve for two streams of fluid, comprising:
   a valve body having a longitudinal opening;
   flow control conduit means having a pair of U-shaped resilient tubes in spaced side by side relation within said body, said tubes having inlet and outlet end portions with axes generally parallel to said longitudinal opening; and
   an elongated tapered cam mounted in said opening for longitudinal and rotational movement, said cam between and engaging central portions of said resilient tubes and adapted to pinch said central portions to thereby close, open and proportion the fluid flow through said flow control conduit means,
   whereby said valve body and said cam have in-line relation, providing a valve with a compact characteristic suitable for lavatory, kitchen, tub and shower.

8. A proportioning valve for two streams of fluid, comprising:
   a valve body having a longitudinal opening;
   flow control conduit means within said body, said flow control conduit means having a pair of U-shaped tubular flow path means in spaced side by side relation, each flow path means having a resilient central portion and inlet and outlet portions, the axis of at least the inlet portion being generally parallel to said longitudinal opening; and
   an elongated tapered cam mounted in said opening for longitudinal and rotational movement, said cam between and engaging said central portions of said U-shaped flow path means and adapted to pinch said central portions to thereby close, open and proportion the fluid flow through said flow control conduit means,
   whereby said valve body and said cam have in-line relation, providing a valve with a compact characteristic suitable for lavatory, kitchen, tub and shower.

* * * * *